United States Patent [19]

Miura et al.

[11] Patent Number: 4,909,362

[45] Date of Patent: Mar. 20, 1990

[54] LOCK-UP CLUTCH OF A TORQUE CONVERTER

[75] Inventors: Hideki Miura; Koji Ichihara; Shinji Fujimoto, all of Neyagawa, Japan

[73] Assignee: Kabushiki Kaisha Daikin Seisakusho, Osaka, Japan

[21] Appl. No.: 304,624

[22] Filed: Feb. 1, 1989

[30] Foreign Application Priority Data

Feb. 4, 1988 [JP] Japan .................. 63-24958

[51] Int. Cl.⁴ .............................. F16H 45/02
[52] U.S. Cl. .................. 192/3.28; 192/3.31
[58] Field of Search ............... 192/3.28, 3.29, 3.3, 192/3.31; 29/521

[56] References Cited

U.S. PATENT DOCUMENTS

| | | | |
|---|---|---|---|
| 4,240,532 | 12/1980 | Blomquist | 192/3.28 |
| 4,437,551 | 3/1984 | Gimmler et al. | 192/3.28 |
| 4,646,886 | 3/1987 | Nishimura | 192/3.28 |
| 4,760,634 | 8/1988 | Rapp | 29/521 |

Primary Examiner—Leslie A. Braun
Assistant Examiner—Andrea Pitts
Attorney, Agent, or Firm—Armstrong, Nikaido, Marmelstein, Kubovcik & Murray

[57] ABSTRACT

A lock-up clutch of a torque converter comprises an input member formed by a front cover of the torque converter, which has an outer peripheral end fixed to a shell of a pump impeller of the torque converter, and covers a rear surface of a shell of a turbine opposite to the impeller; a clutch disk operable to be connected to an inner surface of the front cover and disposed between the front cover and the turbine; and an output part formed by a plurality of output members which are arranged in a circumferential direction of the torque converter, seated on the rear surface of the turbine shell, positioned thereto by convex and concave portions, which are formed thereat and fitted together, and fixed together by fixing means.

4 Claims, 1 Drawing Sheet

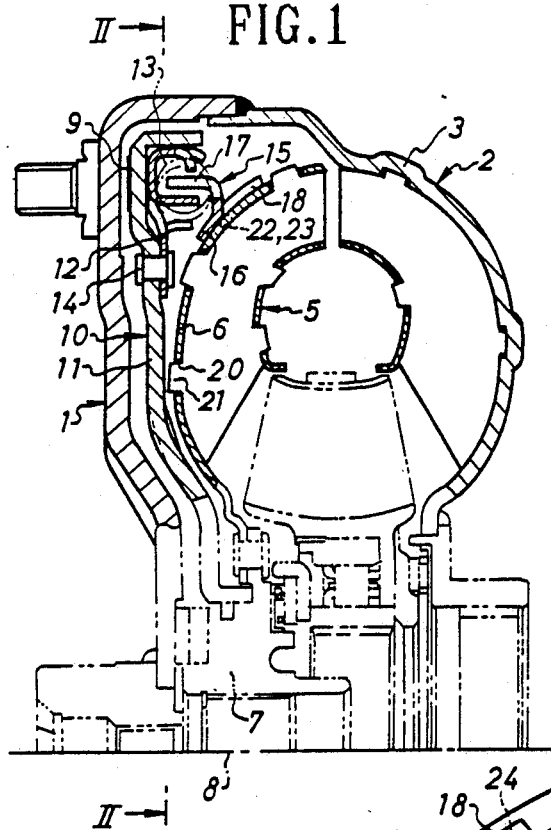
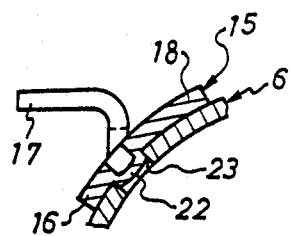
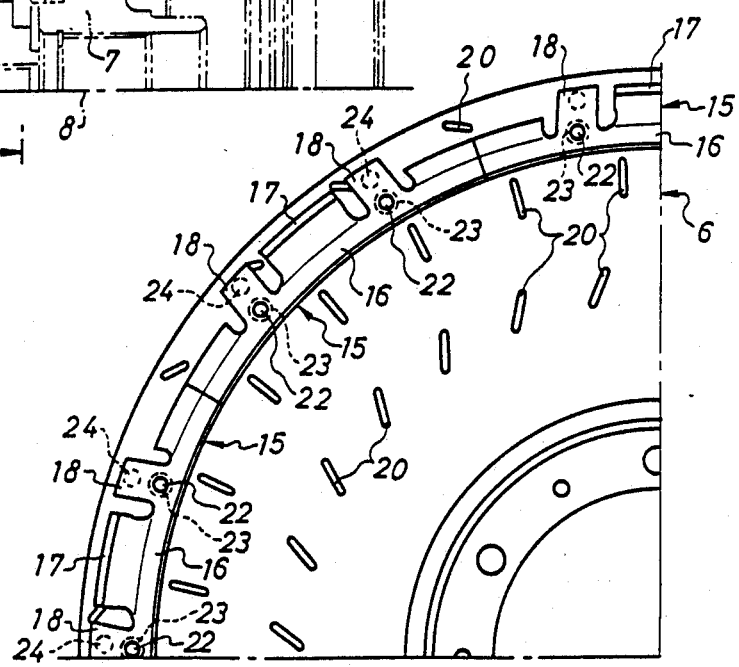

LOCK-UP CLUTCH OF A TORQUE CONVERTER

BACKGROUND OF THE INVENTION (1) Field of the Invention

The present invention relates to a lock-up clutch used in a torque converter for automobiles, and particularly, to a structure for connecting an output part of a clutch disk to a turbine of the torque converter.

(2) Description of the Prior Art

Lock-up clutches of a type concerning with the present invention are disclosed in U.S. Pat. No. 4,240,532, accepted Japanese Utility Model publication No. 61-28126, and Japanese Utility Model application No. 61-170593. In the lock-up clutches disclosed there, an input part of a clutch disk is connected to an output part through damper springs. The output part basically includes an annular body extending in a circumferential direction of the torque converter, and a plurality of claws projected from said annular body and engaging with the said springs. The annular body is welded to a rear or outer surface of a radially outer portion of a turbine shell.

In the above structures, since the output part of the clutch disk is an annularly continuous member having a large outer diameter, and further having a narrow radial width, i.e., a large inner diameter, the yield rate is low in the manufacturing process in which the annular member is blanked from a flat metal sheet.

Accordingly, it is an object of the invention to provided a structure, overcoming the above-noted problem.

SUMMARY OF THE INVENTION

According to the invention, an output part of a lock-up clutch is divided into a plurality of members. If such divided members were fixed to a turbine shell merely by means of welding, as is done in a conventional structure having a continuously annular output member, the accuracy in positioning of the output members may decrease. Taking it into consideration, the output members are positioned with respect to the turbine shell by means of concave and convex portions which are fitted together and formed at them, in the present invention.

BRIEF DESCRIPTION OF THE DRAWINGS

Embodiments of the invention will now be described by way of example only, with reference to the accompanying drawings, in which:

FIG. 1 is a fragmentary sectional view of an embodiment of the invention;

FIG. 2 is a fragmentary view taken along line II—II in FIG. 1; and

FIG. 3 is an enlarged fragmentary view of an output part and a turbine shell.

DETAILED DESCRIPTION OF THE PREFERRED EMBODIMENTS

Referring to FIG. 1, a front cover 1, which is an input member of a lock-up clutch, is welded at its outer peripheral end to a shell of an pump impeller 3. A turbine 5 facing the impeller 2 is fixed at its inner peripheral portion of its shell 6 to a turbine hub 7, which is connected to an output shaft 8 (only a centerline of which is illustrated).

The front cover 1 covers the rear or outer side of the turbine 5. A clutch disk 10 of the look-up clutch is disposed between the front cover 1 and the turbine 5.

The clutch disk 10 has an input member 11 consisting of an annular plate and having a radially outer portion which fixedly carries a friction facing 9 to be pressed against the inner surface of the front cover 1. The input member 11 also functions as a piston, so that it moves toward the front cover 1 to press the friction facing 9 against the front cover 1 for introducing a torque to the clutch disk 10, as a hydraulic pressure applied to the input member 11 from the turbine 5 side relatively increases.

The input member 11 is connected at the radially outer portion to a plurality of damper springs 13 through spring receivers 12. The damper springs 13 are located at the side of the turbine 5 with respect to the input member 11, and are arranged in the circumferential direction of the input member 11. The spring receivers 12, which are made of bent plates and fixed to the input member 11 by rivers 14, engage with ends of damper springs 13, respectively, and also prevent radial and axial (i.e., right and left in FIG. 1) disengaging of the springs 13.

The clutch disk 10 also has a plurality of output members 15, which are made of bent plates and integrally include bodies 16, claws 17 and projections 18, respectively. The body 16 of each output member 15 is closely seated on a radially outer portion of the rear surface (opposite to the impeller) of the turbine shell 6. The claw 17 extends radially outwardly from the body 16, and then is bent axially toward the damper springs 13 to engage with the adjacent damper springs 13 from the sides opposite to the spring receivers 12. The projections 18 extend from the outer periphery of the body 16 toward the outer periphery of the turbine shell 6, and are closely seated on the rear surface of the turbine shell 6.

Referring to FIG. 2, the turbine shell 6 is provided with slits 20, to which outer tabs 21 of turbine blades or vanes shown in FIG. 1 are fixed.

In the illustrated embodiment, nine output members 15 are provided in the entire clutch disk 10, and are annularly arranged as a whole in the circumferential direction of the torque converter in such a condition that the ends thereof are slightly spaced to or contact the ends of the adjacent members 15, respectively. In each output member 15, the body 16 extends in said circumferential direction, and the claw 17 continues to the circumferentially middle portion of the body 16. The projections 18 are arranged at opposite sides of the claw 17, and the opposite ends of the body 16 circumferentially extend beyond the claws 17, respectively.

A circular projection 22 projected toward the turbine shell 6 is formed by a press-punching or the like at a base end of each projection 18 or at a portion of the body 16 adjacent to each projection 18, as shown in FIG. 3. The turbine shell 6 is provided with apertures 23, into which the projections 22 are closely fitted, respectively. Each output member 15 is positioned with respect to the the turbine shell 6 by the projections 22 and the apertures 23 fitted together. Each output member 15 is fixed at outer end portions 24 of the projections 18, shown in FIG. 2, to the turbine shell 6 by spot-welding. The spot-welding may be applied to the opposite ends of each body 16, instead of the portions 24. The fitted portions, i.e., projections 22, may be formed at the opposite ends of the body 16. These positions are selected with taking the manufacturing process into consideration. The spot-welding at the portions 24 or the ends of the bodies 16 may be eliminated, in which case, the fitted portions formed by the projections 22 and the apertures 23 are fixed by means of welding or other conventional manner.

In the structure described hereinabove, the output part of the large diameter disposed at the radially outer portion of the disk 10 is formed by a plurality of divided output members 15. Therefore, the yield rate in the manufacturing of the output part can be improved. Further, since the output members 15 are positioned with respect to the turbine shell 6 by the convex and concave portions fitted together (i.e., the projections 22 and the apertures 23), the assembling operation can be facilitated, while maintaining the high positioning accuracy to ensure the intended performance of the lock-up clutch.

What is claimed is:

1. A lock-up clutch of a torque converter comprising:
    an input member formed by a front cover of a torque converter, which has an outer peripheral end fixed to a shell of a pump impeller of the torque converter, and covers a rear surface of a shell of a turbine opposite to said impeller;
    a clutch disk operable to be connected to an inner surface of said front cover and disposed between said front cover and said turbine; and
    an output part formed by a plurality of output members which are arranged in a circumferential direction of the torque converter and seated on said rear surface of said turbine shell, said plurality of output members being positioned on said rear surface of said turbine by convex portions formed on one of said plurality of output members and fitted in openings formed in said rear surface of said turbine shell and fixed to said openings by fixing means.

2. A lock-up clutch as claimed in claim 1 wherein said fixing means is welding.

3. A lock-up clutch as claimed in claim 1 wherein said convex portions are projections formed in said outer members.

4. A lock-up clutch as claimed in claim 1 wherein each of said output members has a body of a substantially arc shape extending in the circumferential direction, and a bent claw extending from the body to engage with a damper spring in said clutch disk.

* * * * *